(12) United States Patent
Hites

(10) Patent No.: US 10,766,107 B2
(45) Date of Patent: Sep. 8, 2020

(54) TRANSMISSION SHAFT DISASSEMBLY PRESS FIXTURE

(71) Applicant: HONDA MOTOR CO., LTD., Tokyo (JP)

(72) Inventor: Jordan Hites, Sidney, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 291 days.

(21) Appl. No.: 15/798,908

(22) Filed: Oct. 31, 2017

(65) Prior Publication Data
US 2019/0126414 A1    May 2, 2019

(51) Int. Cl.
| | |
|---|---|
| *B23P 19/02* | (2006.01) |
| *B23P 19/04* | (2006.01) |
| *B23P 19/10* | (2006.01) |
| *F16H 1/00* | (2006.01) |

(52) U.S. Cl.
CPC .............. *B23P 19/02* (2013.01); *B23P 19/04* (2013.01); *B23P 19/10* (2013.01); *F16H 1/00* (2013.01)

(58) Field of Classification Search
CPC ..... B23P 9/00; B23P 9/02; B23P 11/00; B23P 11/005; B23P 19/00; B23P 19/02
See application file for complete search history.

(56) References Cited

U.S. PATENT DOCUMENTS

| | | | | |
|---|---|---|---|---|
| 1,559,705 A * | 11/1925 | Jackson | ............... | A47B 49/004 312/305 |
| 2,075,972 A | 4/1937 | Curtiss | | |
| 3,103,064 A | 9/1963 | Hawkins | | |
| 4,210,990 A | 7/1980 | Krieger | | |
| 4,763,394 A * | 8/1988 | Decato | .................... | B23P 19/02 29/252 |
| 4,936,003 A * | 6/1990 | Gloe | ....................... | B25B 27/02 29/254 |
| 6,886,227 B1 * | 5/2005 | Hedrick | .................. | B25B 27/02 29/252 |
| 8,695,198 B2 * | 4/2014 | Dagenais | ........... | B23K 37/0533 29/468 |
| 2005/0087586 A1 * | 4/2005 | Vermaat | ............ | B23K 37/0533 228/212 |

FOREIGN PATENT DOCUMENTS

| | | |
|---|---|---|
| JP | 2000198597 A | 7/2000 |
| KR | 101338961 B1 | 12/2013 |
| SU | 459329 A | 4/1975 |

\* cited by examiner

*Primary Examiner* — Lee D Wilson
(74) *Attorney, Agent, or Firm* — Arent Fox LLP

(57) ABSTRACT

Examples in the disclosure relate to an apparatus and method for disassembling automatic transmission shaft assemblies. The apparatus may include a body portion defining multiple gear lands oriented normal to a pressing direction, each gear land having a semi-circular shape partially encompassing a central opening. The apparatus may include a moveable portion limited to movement between generally opposing positions, movement thereof reconfiguring the apparatus to enable positioning of a plurality of transmission shaft assemblies each having a unique configuration. The method may include sequentially placing each transmission shaft on the fixture, pressing the transmission shaft to remove press-fit components, and reconfiguring the fixture to enable positioning of a next shaft assembly, each shaft assembly having a unique configuration of press-fit components.

20 Claims, 6 Drawing Sheets

TRANSMISSION SHAFT DISASSEMBLY PRESS FIXTURE

FIELD

Aspects of the present disclosure relate to devices and methods of use thereof in automotive assembly and/or disassembly, and in particular to devices and methods of use thereof for transmission shaft disassembly.

BACKGROUND

An automatic transmission may include multiple shafts within a transmission case. Each shaft may have one or more gears and/or clutches press-fit onto the shaft. Through use over time, a transmission may become worn or less effective. A transmission may be rebuilt to restore its functionality. Rebuilding a transmission often includes disassembling each of the shafts by removing the press-fit gears and clutches from the shafts. A press, such as a hydraulic press, may be used to apply pressure to the shaft to remove the gears and clutches.

Conventionally, each shaft is pressed using a different fixture to orient the shaft correctly and hold the gears and clutches while the shaft is pressed relative thereto. The use of different fixtures may require using multiple hydraulic presses or swapping of fixtures to disassemble the multiple shafts of a transmission.

In view of the foregoing, there is a need for devices and techniques for facilitating transmission shaft disassembly. Further advantages will become apparent from the disclosure provided below.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In an aspect, the disclosure provides an apparatus for radially aligning a shaft having a plurality of gears attached thereto for use with a hydraulic press. The apparatus may include a body portion defining multiple gear lands oriented normal to a pressing direction, each gear land having a semi-circular shape partially encompassing a central opening. The apparatus may include a moveable portion limited to movement between generally opposing positions, movement thereof being usable to reconfigure the apparatus to enable positioning of a plurality of transmission shaft assemblies each having a unique configuration.

In another aspect, the disclosure provides a method of disassembling an automatic transmission and/or portions thereof. The method may include placing a first transmission shaft assembly on a fixture to orient the first transmission shaft and any components press-fit thereto with respect to a press. The method may include pressing, using the press, the first transmission shaft to remove press-fit components from the first transmission shaft. The method may include reconfiguring the fixture to enable placement of a second transmission shaft assembly having a different configuration than the first transmission shaft assembly. The method may include placing the second transmission shaft on the fixture to orient the second transmission shaft and/or any press-fit components with respect to a press. The method may include pressing, using the press, the second transmission shaft to remove press-fit components from the second transmission shaft.

In another aspect, the disclosure provides a system for disassembling a plurality of transmission shaft assemblies. The system may include a hydraulic press and a fixture. The fixture may include a body portion defining a plurality of gear lands oriented normal to a pressing direction of the hydraulic press, each gear land having a semi-circular shape partially encompassing a central opening. The fixture may include a moveable portion limited to movement between generally opposing positions, movement thereof reconfiguring the fixture to enable positioning of each of the plurality of transmission shaft assemblies in axial alignment with the hydraulic press, each of the assemblies having a unique configuration.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale, and certain figures may be shown in exaggerated or generalized form in the interest of clarity and conciseness. The disclosure itself, however, as well as a preferred mode of use, further features and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "vehicle," as used herein, refers to any moving vehicle that may be capable of carrying one or more human occupants and is powered by any form of energy. The term "vehicle" includes, but is not limited to: cars, trucks, vans, minivans, sport utility vehicles (SUVs), motorcycles, scooters, boats, personal watercraft, and aircraft. In some cases, a motor vehicle includes one or more engines.

Generally described, aspects of the present disclosure provide a fixture for positioning different transmission shafts having one or more components press-fit thereon with respect to a press for disassembling the components from the transmission shafts. The fixture includes a main body defining multiple gear lands oriented normal to a pressing direction. In an implementation, the fixture may be mounted to a vertical hydraulic press, such that the press exerts downward pressure on the shaft while the gear lands support various gears and/or clutches of the shaft assembly. Accordingly, the downward pressure may dislocate the press-fit gears and/or clutches to free the shaft. Each of the components may then be removed.

The fixture may include a moveable portion positionable in one of two generally opposing positions. For example, the moveable portion may move between a retracted position and an extended position. The moveable portion may contact an outer surface of a gear, clutch, or shaft to position the gear, clutch, or shaft during pressing. The moveable portion may be positioned based on the shaft to be pressed. Accordingly, the same fixture may be used to sequentially press each of the shafts in the transmission without moving the main body of the fixture.

Figure 1:
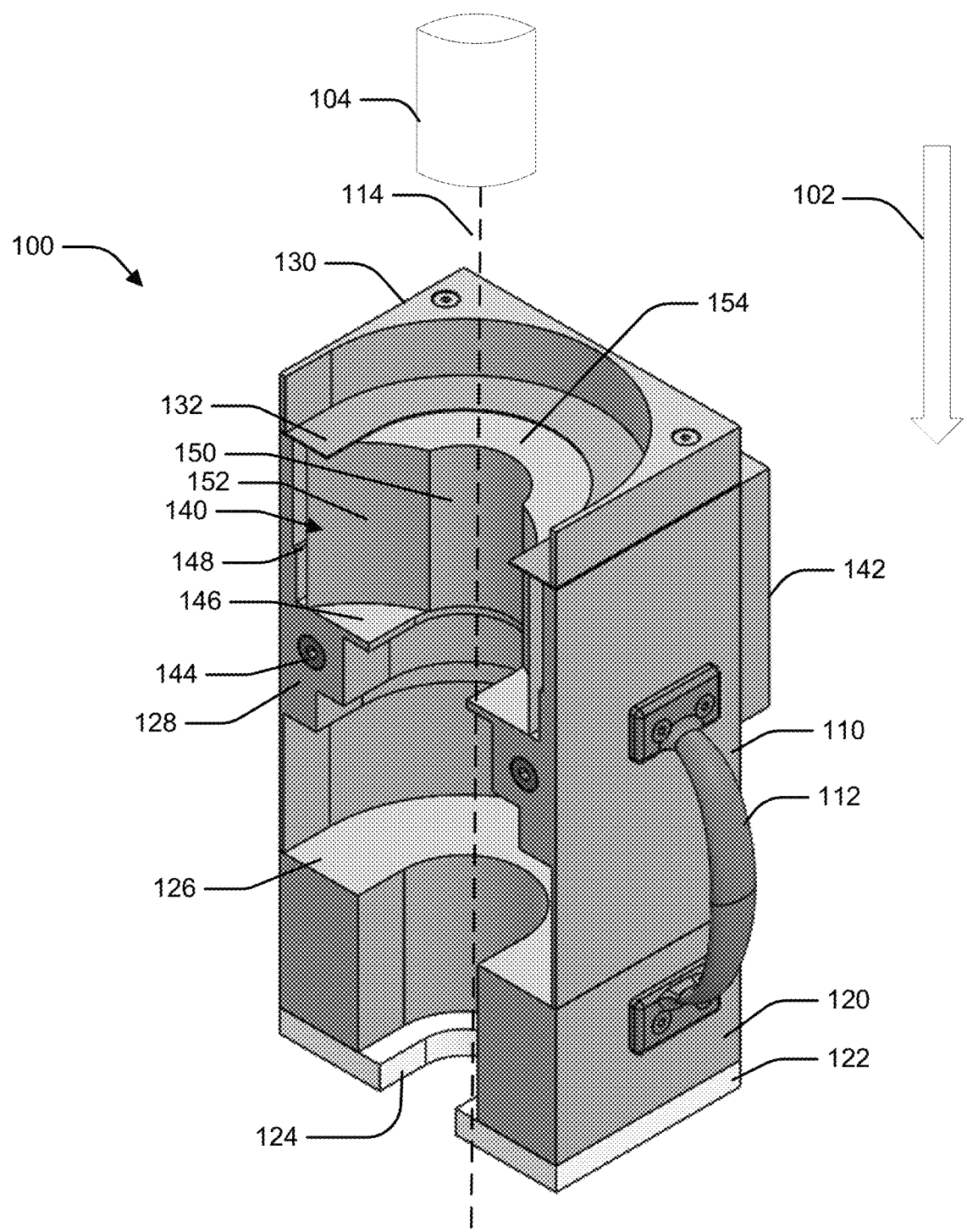
FIG. 1 is a perspective view showing an example fixture for positioning an transmission shaft assembly, according to an aspect of the disclosure.

Turning to FIG. 1, an example fixture 100 may include a main body portion 110, which may have a generally rectangular prism shape with a central opening extending to one side. For example, a horizontal cross-section of the fixture 100 may have three planar sides oriented at right angles at their adjacent joining edges and a fourth side having a notch extending to a center line 114. A transmission shaft may be aligned along the center line 114. A handle 112 may extend from one or more sides of the main body 110 and be used, for example, for moving or positioning the fixture 100 with respect to a hydraulic press 104. The hydraulic press 104 is illustrated in block form representing the end of the press shaft. It should be understood that the fixture 100 may be used with various commercially available hydraulic presses.

The main body 110 may define multiple gear lands. A gear land may be a horizontal surface (i.e., normal to a pressing direction 102) that can support a gear, clutch, or other component press-fit on a shaft. For example, the main body 110 may include a lower block 120 having a lower gear land 126 formed as the top surface of the lower block 120. The lower block 120 may have a generally semi-circular horizontal cross-section. The lower block 120 may include or be attached to a lower plate 122, which may in turn be mounted on a press assembly, for example. The lower plate 122 may have a notch 124 allowing a shaft to pass through the lower plate 122.

The main body 110 may include a middle block 128 above and spaced apart from the lower block 120. The middle block 128 may define a middle gear land 146. Similar to the lower gear land 126, the middle gear land 146 may include a central opening extending to the open side.

A moveable portion 140 may be positioned above the middle gear land 146 and move perpendicular to the pressing direction 102. The moveable portion 140 may be a block having a generally semi-annular shape. A moveable plate 142 may be attached to a surface of the block opposite the opening of the semi-annular shape. The moveable portion 140 may be moveable between a retracted position where the moveable plate 142 is adjacent the main body 110 and an extended position in which the moveable plate 142 extends away from the main body 110. A central surface 150 may be semi-annular with a first radius of curvature corresponding to a size of a shaft. The central surface 150 may contact the shaft when the moveable portion 140 is in the retracted position. A second partially radially extending surface 152 may be located radially outward from the central surface 150 and have a larger radius of curvature than that of the central surface 150. The surface 152 may contact an outer surface of a gear or clutch when the moveable portion 140 is in an extended position. For example, as illustrated in FIG. 1, the moveable portion 140 is in a retracted position where the central surface 150 of the moveable portion 140 is closest to the center line 114. The moveable portion 140 may include a top surface 154, which may serve as a gear land when the moveable portion 140 is in the retracted position.

The moveable portion 140 may be mounted above the middle block 128. For example, the middle block 128 may include bores retaining sliding rods 144, which may extend to the moveable plate 142. The moveable plate 142 may contact the main body 110 when the moveable portion 140 is in a retracted position. The sliding rods 144 may include springs that bias the moveable plate 142 toward the main body 110 to urge contact between the moveable portion 140 and a gear placed within the fixture 100. The moveable portion 140 may also be supported on a keyway 148 that provides registration between the moveable portion 140 and the middle block 128.

The fixture 100 may include an upper block 130 above the main body 110. The upper block 130 may be a rectangular prism with a semi-circular central opening. The upper block 130 may include an upper gear land 132, which may be a relatively thin semi-circular shelf extending radially inward toward the center line 114. The upper block 130 may be mounted above the moveable portion 140 and retain the moveable portion 140.

The components of the fixture 100 may be manufactured using manufacturing techniques such as computer numeric controlled (CNC) tooling, additive manufacturing, or casting. The sliding rods 144 may be mounted to the sliding plate of the moveable portion 140. The entire moveable portion 140 may then be positioned on the main body 110. The upper block 130 may be mounted to the main body 110 via fasteners, such as bolts. The upper block 130 may retain the moveable portion 140 within the main body 110.

Figure 2:
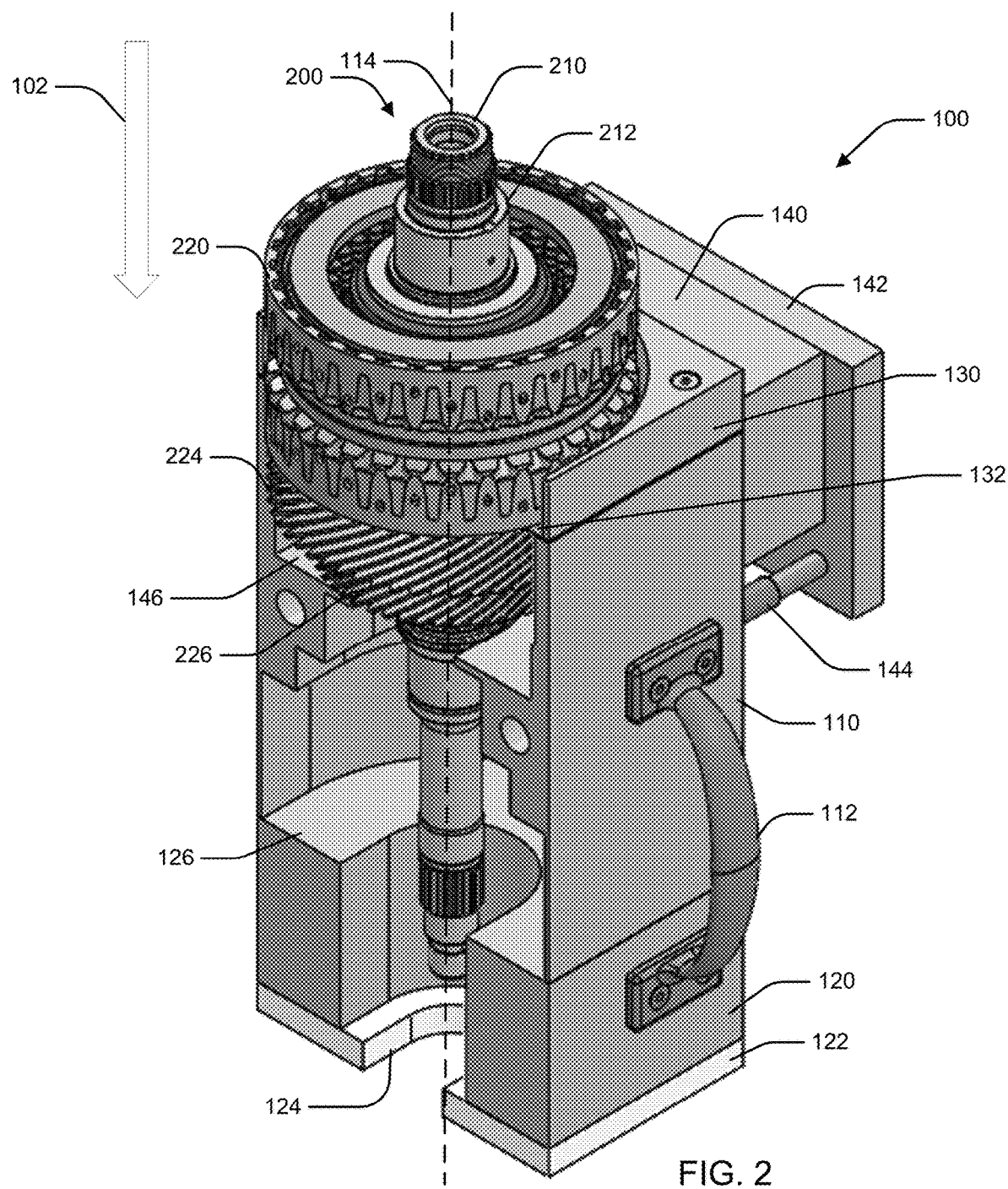
FIG. 2 is a perspective view showing the example fixture of FIG. 1 with a main shaft assembly mounted thereon.

FIG. 2 illustrates a main shaft assembly 200 mounted within the fixture 100. A main shaft 210 may be aligned with the center line 114. A gear collar 212 may surround the main shaft 210. For example, the gear collar 212 may be an M3 gear collar. A clutch pack 220 may be supported on the upper gear land 132. For example, the clutch pack 220 may be a 3-6 clutch. The clutch pack 220 may support the gear collar 212. A gear 226 may be supported on the middle gear land 146. For example the gear 226 may be an M4 gear. A gear 224 may be located between the gear 226 and the clutch pack 220 and may be supported by the gear 226 when the main shaft 210 is pressed. For example, the gear 224 may be an M6 gear. The moveable portion 140 may be in the extended position shown, for example, depending on the radius of the corresponding gear. For example, the moveable plate 142 may extend outward to allow the moveable portion 140 to accommodate the corresponding gear. The surface 152 (not shown) may contact the gear 224. In an aspect, the moveable portion 140 may be biased toward the retracted position such that the surface 152 is urged into contact with the gear 224. When the main shaft 210 is pressed, the main shaft 210 may move in the pressing direction 102 relative to the upper gear land 132 and the middle gear land 146, causing the gear collar 212, clutch pack 220, gear 226, and gear 224 to be forced from the main shaft 210. Accordingly, the main shaft assembly 200 may thereby be disassembled.

Figure 3:
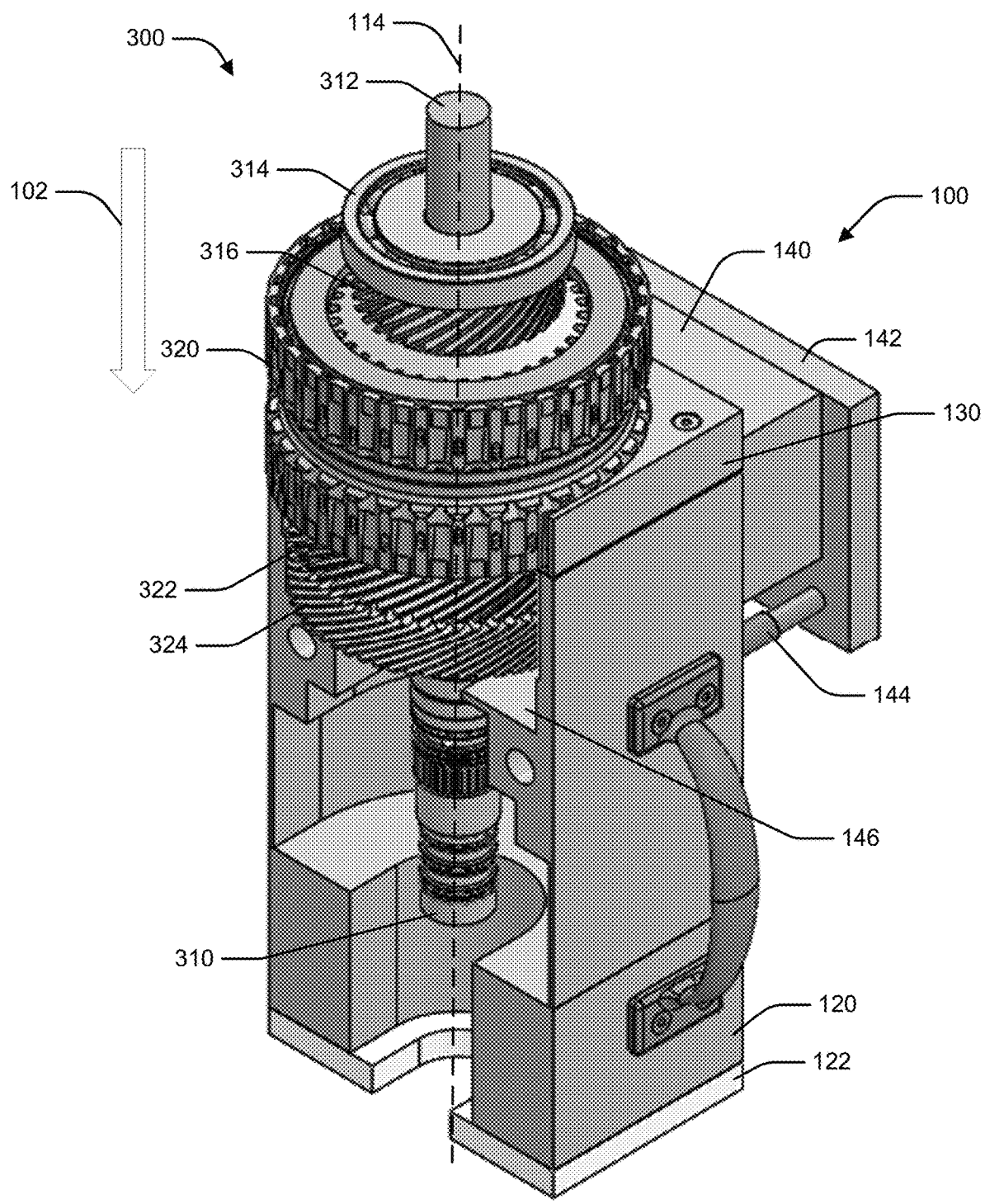
FIG. 3 is a perspective view showing the example fixture of FIG. 1 with a secondary shaft assembly mounted thereon.

FIG. 3 illustrates a secondary shaft assembly 300 mounted on the fixture 100. A secondary shaft slug 312 may be placed on the secondary shaft 310 and aligned with the center line 114. A clutch pack 320 may be supported on the upper gear land 132 (not shown). For example, the clutch pack 320 may be a 2-5 clutch. A ball bearing 314 and a gear 316 may be supported on the clutch pack 320. The gear 316 may be an S2 gear, for example. A gear 324 may be supported on the middle gear land 146. For example, the gear 324 may be an S1 gear. A gear 322 may be supported on the gear 324. For example, the gear 322 may be an S5 gear. The moveable portion 140 may be in the extended position shown, for example, depending on the radius of the corresponding gear. The surface 152 (not shown) may contact the gear 322. When the secondary shaft slug 312 is pressed, the secondary shaft 310 may move in the pressing direction 102 relative to the upper gear land 132 and the middle gear land 146, causing the clutch pack 320, ball bearing 314, gear 316, gear 322, and gear 324 to be pressed from the secondary shaft 310. Accordingly, the secondary shaft assembly 300 may thereby be disassembled.

Figure 4:
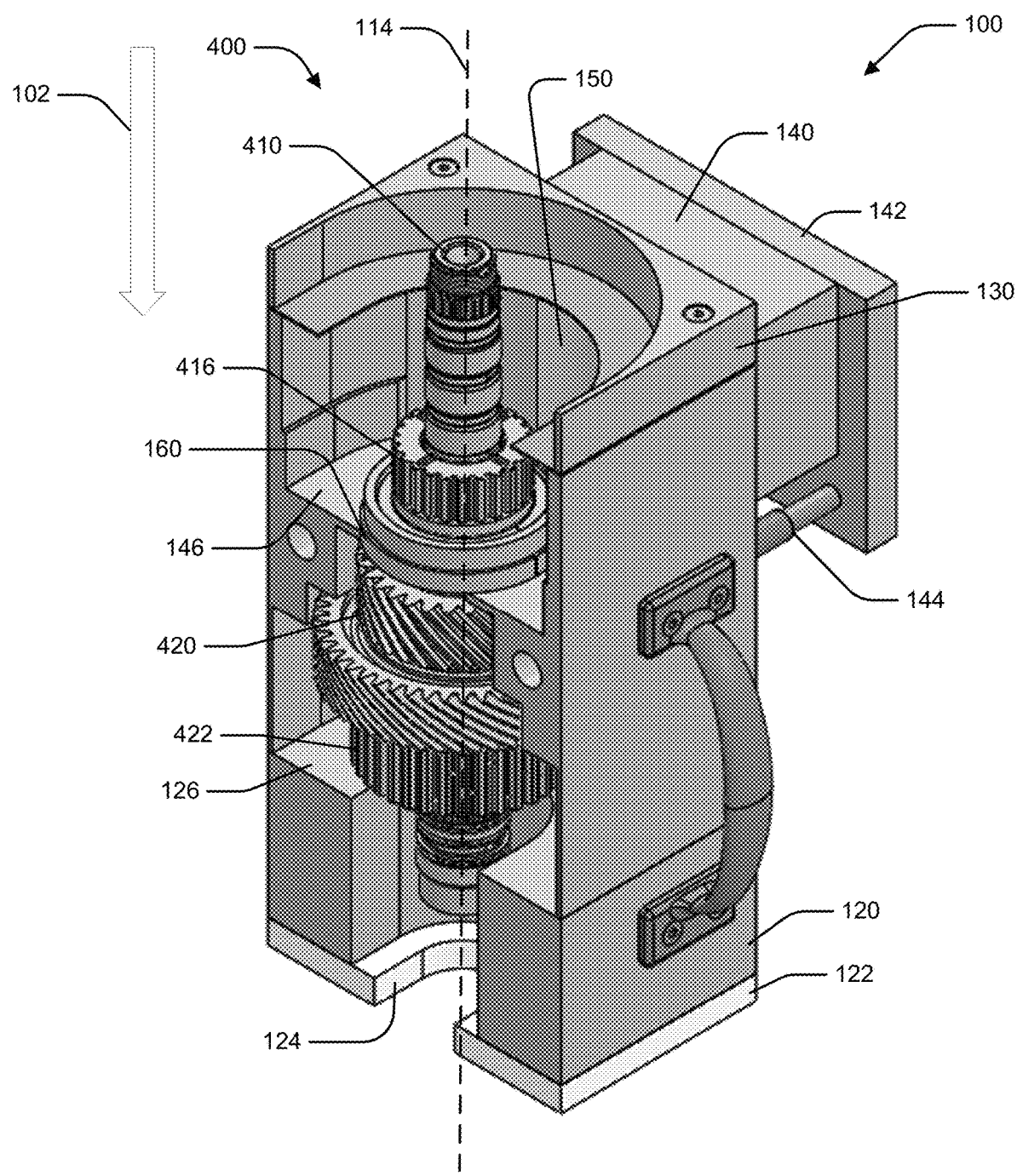
FIG. 4 is a perspective view showing the example fixture of FIG. 1 with a third shaft assembly mounted thereon.

FIG. 4 illustrates a third shaft assembly 400 mounted on the fixture 100. A third shaft 410 may be aligned with the center line 114. As shown in FIG. 4, a selector hub 416 may be above the middle gear land 146, but may be too small to be supported on the middle gear land 146. A hub puller fixture 160 may support the selector hub 416 on the middle gear land 146. The hub puller fixture 160 may be an annular member positionable around the third shaft 410. The hub puller fixture 160 may have an outer diameter greater than a diameter of the opening in the middle gear land 146 and an inner diameter less than the diameter of the opening in the middle gear land 146. In an implementation, the hub puller fixture 160 includes two or more interlocking components. For example, the hub puller fixture may include two interlocking semi-annular segments and an outer ring to hold the semi-annular segments together. A gear 422 may be supported on the lower gear land 126. For example, the gear 422 may be an T4 gear. A gear 420 may be supported on the gear 422. For example, the gear 420 may be a T6 gear. The moveable portion 140 may be in the extended position. The central surface 150 may support the hub puller fixture 160. When the third shaft 410 is pressed, the third shaft 410 may move in the pressing direction 102 relative to the middle gear land 146 and the lower gear land 126, causing the hub puller fixture 160, selector hub 416, gear 422, and gear 420 to be pressed from the third shaft 410. Accordingly, the third shaft assembly 400 may thereby be disassembled.

Figure 5:
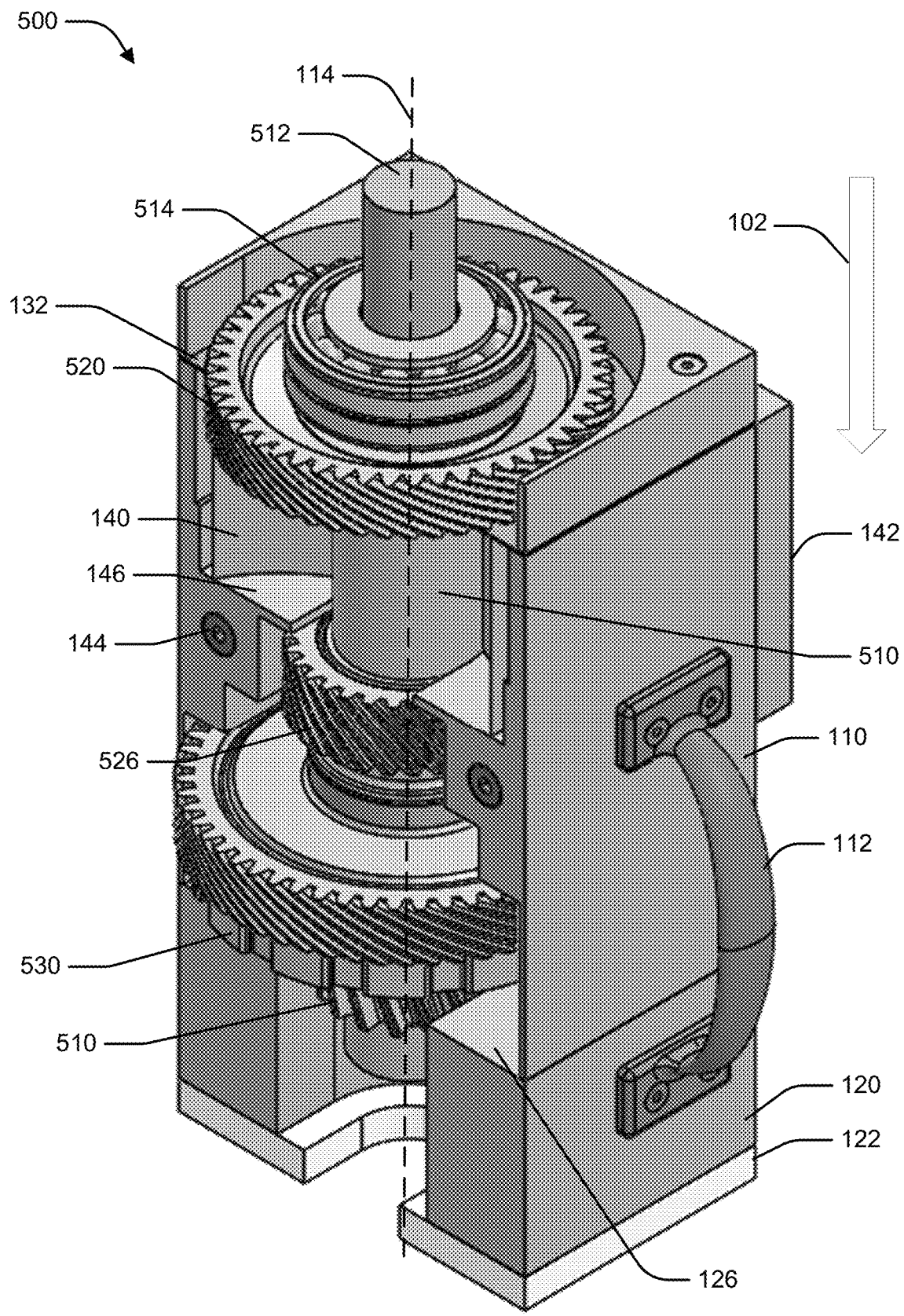
FIG. 5 is a perspective view showing the example fixture of FIG. 1 with a counter shaft assembly mounted thereon.

FIG. 5 illustrates a counter shaft assembly 500 mounted on the fixture 100. A counter shaft slug 512 may be aligned with the center line 114. A gear 520 may be supported on the upper gear land 132. For example, the gear 520 may be a C2 gear. The gear 520 may support a ball bearing 514. A gear assembly 530 may be supported on the lower gear land 126. For example the gear assembly 530 may be a CL gear assembly. As shown in FIG. 5, a gear 526 may be above the gear assembly 530 and may be supported by the gear assembly 530 when the counter shaft slug 512 is pressed. For example, the gear 526 may be a C5 gear. The moveable portion 140 may be in the retracted position. The central surface 150 (not shown) may contact the counter shaft 510. When the counter shaft slug 512 is pressed, the counter shaft 510 may move in the pressing direction 102 relative to the upper gear land 132 and the lower gear land 126, causing the gear 520, ball bearing 514, gear assembly 530, and gear 526 to be pressed from the counter shaft 510. Accordingly, the counter shaft assembly 500 may thereby be disassembled.

Figure 6:
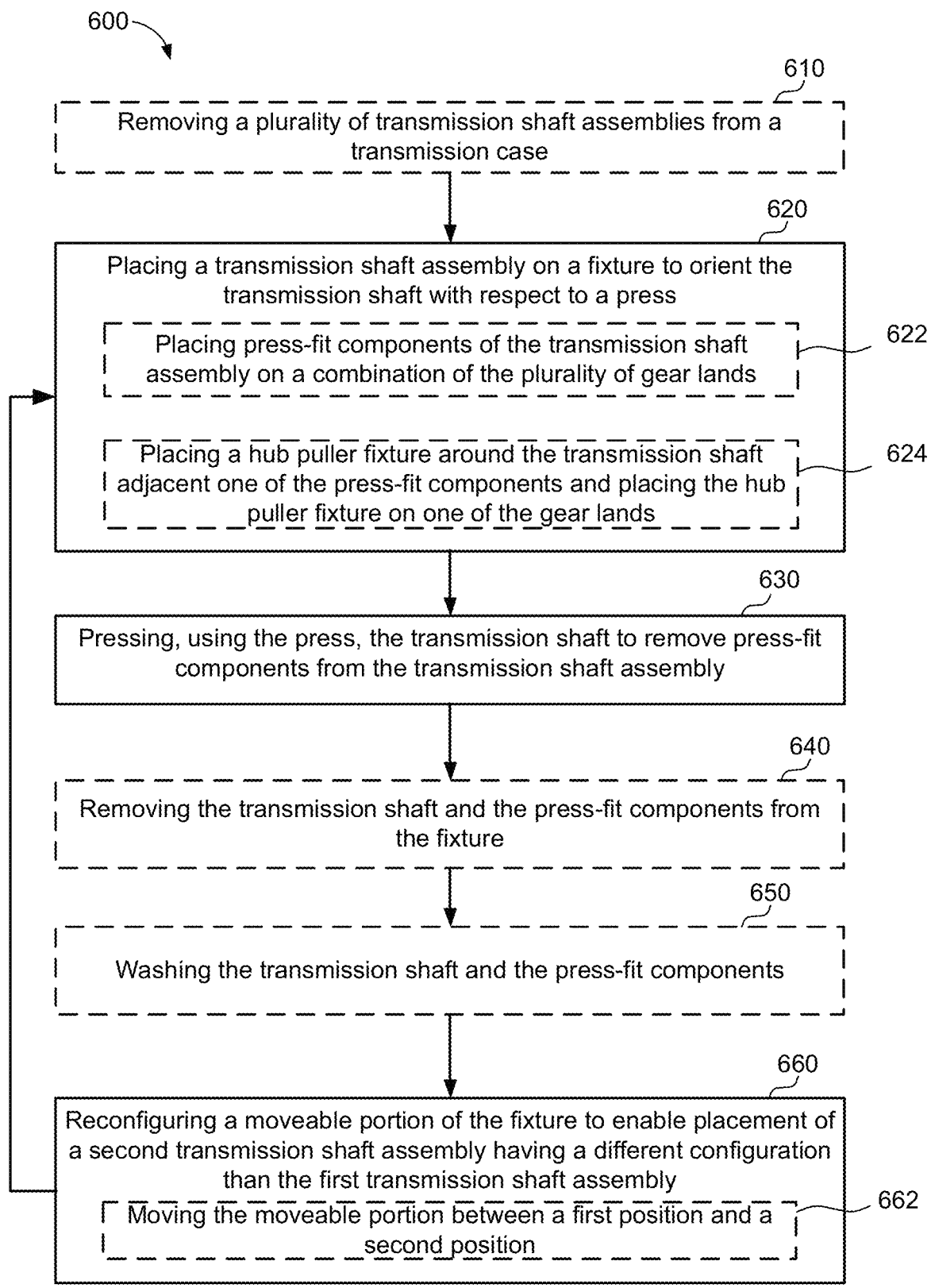
FIG. 6 is a flowchart showing an example method of disassembling transmission shafts.

FIG. 6 is a flowchart showing an example method 600 for disassembling transmission shafts in accordance with aspects of the present disclosure. The method 600 may be performed by an operator using the fixture 100 and the press 104, for example, or may be fully automated.

At block 610, the method 600 may optionally include removing one or more transmission shafts from a transmission case. In an aspect, for example, an operator may remove a plurality of transmission shafts from a transmission case. For example, the plurality of transmission shaft assemblies may include the main shaft assembly 200, the secondary shaft assembly 300, the third shaft assembly 400, and the counter shaft assembly 500. Each shaft assembly may include at least a shaft and one or more press-fit components such as gears, hubs, clutches, or bearings.

At block 620, the method 600 may include placing a transmission shaft assembly on a fixture to orient the transmission shaft with respect to a press. The method steps/acts at block 620 may be performed for each of the plurality of transmission shaft assemblies. For example, the operator may place the main shaft assembly 200 of FIG. 2 on the fixture 100 to orient the main shaft 210 with respect to the press 104. The main shaft 210 may be aligned with a center line 114. When the method 600 returns to the block 620, the operator may place a different transmission shaft assembly on the fixture 100 (e.g., per FIG. 3).

The block 620 may optionally include the block 622, which may include locating one or more press-fit components of the transmission shaft assembly on a first combination of the plurality of gear lands. For example, the operator may position the main shaft assembly 200 as illustrated in FIG. 2. The clutch pack 220 may be located on the upper gear land 132, and the gear 226 may be located on the middle gear land 146. In this example, disassembly of the main shaft assembly 200 may not include use the lower gear land 126. As a second example, the counter shaft assembly 500 may be placed on the fixture 100 as illustrated in FIG. 5. The gear 520 may be located on the upper gear land 132, and the gear assembly 530 may be located on the lower gear land 126. In the example of the counter shaft assembly 500, the middle gear land 146 may not support any press-fit component. Accordingly, the counter shaft assembly 500 may utilize a different combination of gear lands than the main shaft assembly 200.

Block 620 may optionally include the block 624, which may include placing a hub puller fixture about the transmission shaft adjacent one of the press-fit components and locating the hub puller fixture on one of the gear lands. For example, an operator may place the hub puller fixture 160 around the third shaft 410 adjacent the selector hub 416 and locate the third shaft assembly 400 on the fixture 100. The hub puller fixture 160 may be located on the middle gear land 146, and the gear 422 may be placed on the lower gear land 126.

In block 630, the method 600 may include using the press to press the transmission shaft so as to remove one or more press-fit components from the transmission shaft assembly. In an aspect, for example, the operator may press, using the press 104, the transmission shaft 210, 310, 410, 510 of FIGS. 2-5 mounted on the fixture 100 to remove the respective press-fit components from the transmission shaft assemblies 200, 300, 400, and 500. The operator may operate the press 104 according to the operating procedures for the press 104. For example, the operator may press a button to activate a hydraulic drive, pull a lever, or turn a crank to operate the press 104. Operation of the press 104 may result in a press shaft moving in the pressing direction 102, as shown in FIGS. 2-5, for example.

In block 640, the method 600 may optionally include removing the transmission shaft and the press-fit components from the fixture 100. For example, the operator may remove the transmission shaft 210, 310, 410, 510 from the fixture 100, as shown in FIGS. 2-5. After pressing, each of the press-fit components may remain loosely about the transmission shaft, depending on the shaft and the component position. The operator may manually separate each press-fit component from the transmission shaft as appropriate.

In block 650, the method 600 may optionally include washing the transmission shaft and the press-fit components. For example, the operator may wash the transmission shaft 210, 310, 410, 510 of FIGS. 2-5, along with the press-fit components. For instance, the operator may place each component in a cleaning solution.

In block 660, the method 600 may include reconfiguring the fixture to enable placement of a second transmission shaft assembly having a different configuration than the first transmission shaft assembly. In an aspect, for example, the operator may reconfigure the fixture 100 to enable placement of a second transmission shaft assembly having a different configuration than the first transmission shaft assembly. For example, if the first transmission shaft assembly is the main shaft assembly 200 of FIG. 2, the second transmission shaft assembly may be any of the secondary shaft assembly 300 of FIG. 3, the third shaft assembly 400 of FIG. 4, or the counter shaft assembly 500 of FIG. 5. The fixture 100 may remain mounted to the press 104 while being reconfigured. In block 662, the block 660 may include moving a moveable portion between a first position and a second position. For example, the operator may move the moveable portion 140 between the extended position and the retracted position when the first transmission shaft assembly is the main shaft assembly 200 of FIG. 2 and the second transmission shaft assembly is the counter shaft assembly 500 of FIG. 5. Further, it should be appreciated that the method 600 may proceed from the block 660 to the block 620 to provide for disassembly of the second transmission shaft assembly. The method 600 may repeat blocks 620, 630, 640, 650, and 660 as needed until all transmission shaft assemblies are disassembled.

Described herein are example apparatus and methods for disassembling multiple shafts of an automatic transmission. In particular, each of the multiple shafts may include one or more press-fit components that may be removed by pressing the shaft while supporting the press-fit components. More specifically, a fixture is described that allows multiple shafts having different configurations to be pressed using the same fixture and press. A moveable portion of the fixture allows the fixture to be reconfigured for different shaft assemblies without removing the fixture from the press. Moreover, operation of the fixture and press is an ergonomic improvement over known pressing techniques using multiple presses and/or fixtures.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. An apparatus for axially aligning a shaft having a plurality of gears attached thereto with a hydraulic press, the apparatus comprising:
   the hydraulic press;
   a body portion defining a plurality of gear lands oriented normal to a pressing direction of the hydraulic press, each gear land having a semi-circular shape partially encompassing a central opening; and
   a moveable portion limited to movement between generally opposing positions, movement thereof reconfiguring the apparatus to enable positioning of each of a plurality of transmission shaft assemblies in axial alignment with the hydraulic press, each of the assemblies having a unique configuration.

2. The apparatus of claim 1, wherein the moveable portion is moveable between a retracted position and an extended position.

3. The apparatus of claim 2, wherein the moveable portion is biased toward the retracted position.

4. The apparatus of claim 2, wherein the moveable portion includes a top surface that forms a gear land when in a retracted position.

5. The apparatus of claim 1, wherein the moveable portion slides perpendicularly to the pressing direction.

6. The apparatus of claim 1, wherein the moveable portion extends between a first gear land of the plurality of gear lands and a second gear land of the plurality of gear lands.

7. The apparatus of claim 1, further comprising a handle.

8. The apparatus of claim 1, further comprising:
   an annular hub puller positionable around a shaft so as to be leveraged by at least one of the plurality of gear lands, wherein the hub puller has an outer diameter greater than a diameter of the opening in the gear land and an inner diameter less than the diameter of the opening in the gear land.

9. The apparatus of claim 8, wherein the annular hub puller comprises interlocking semi-annular segments.

10. A method of disassembling an automatic transmission, comprising:
    placing a first transmission shaft assembly on a fixture in a position to orient the first transmission shaft with respect to a press, wherein the fixture comprises:
       a body portion defining a plurality of gear lands oriented normal to a pressing direction of the press, each gear land having a semi-circular shape partially encompassing a central opening; and
       a moveable portion limited to movement between generally opposing positions, movement thereof reconfiguring the fixture to enable positioning of each of the plurality of transmission shaft assemblies in axial alignment with the press, each of the assemblies having a unique configuration;
    pressing, using the press, the first transmission shaft to remove at least one of a plurality of press-fit components from the first transmission shaft;
    reconfiguring a moveable portion of the fixture to enable emplacement of a second transmission shaft assembly having a different configuration than the first transmission shaft assembly;
    placing the second transmission shaft on the fixture in a position to orient the second transmission shaft with respect to the press; and
    pressing, using the press, the second transmission shaft to remove at least one of a plurality of press-fit components from the second transmission shaft.

11. The method of claim 10, wherein reconfiguring the moveable portion of the fixture comprises:
    moving the moveable portion between a first position wherein a first surface of the moveable portion contacts an outer surface of at least a first one of the plurality of press-fit components of the first shaft and a second position wherein a second surface of the moveable portion contacts an outer surface of at least a second one of the plurality of press-fit components of the second shaft.

12. The method of claim 11, wherein reconfiguring the moveable portion of the fixture comprises moving the movable portion while the fixture remains in position with respect to the press.

13. The method of claim 10, wherein the fixture includes a plurality of gear lands extending inward from a main body portion, wherein placing the first transmission shaft on the fixture comprises emplacement of at least one of the plurality of press-fit components on a first combination of the plurality of gear lands.

14. The method of claim 13, wherein placing the second transmission shaft on the fixture comprises emplacement of at least one of the plurality of press-fit components on a second combination of the plurality of gear lands.

15. The method of claim 13, wherein placing the first transmission shaft on the fixture comprises emplacing a hub puller fixture about the first transmission shaft adjacent one of the plurality of press-fit components and placing the hub puller fixture adjacent one of the plurality of gear lands.

16. The method of claim 10, further comprising removing a plurality of transmission shafts including the first transmission shaft and the second transmission shaft from a transmission case.

17. The method of claim 10, further comprising removing the first shaft and each of the plurality of press-fit components from the fixture.

18. The method of claim 17, further comprising washing the first shaft and each of the plurality of press-fit components.

19. A system for disassembling a plurality of transmission shaft assemblies, comprising:

a hydraulic press; and a fixture comprising:

a body portion defining a plurality of gear lands oriented normal to a pressing direction of the hydraulic press, each gear land having a semi-circular shape partially encompassing a central opening; and a moveable portion limited to movement between generally opposing positions, movement thereof reconfiguring the fixture to enable positioning of each of the plurality of transmission shaft assemblies in axial alignment with the hydraulic press, each of the assemblies having a unique configuration.

20. The system of claim 19, wherein the moveable portion is moveable between a retracted position and an extended position.

* * * * *